United States Patent [19]
Oyama et al.

[11] Patent Number: 5,962,160
[45] Date of Patent: Oct. 5, 1999

[54] SODIUM-SULFUR BATTERY, AND A BATTERY SYSTEM USING SAME

[75] Inventors: Tetsuo Oyama, Takahagi; Tadahiko Miyoshi, Hitachi; Manabu Madokoro, Hitachi; Hisamitsu Hatoh, Hitachi; Shigeoki Nishimura, Hitachinaka; Katsuhiko Shiota, Tokai-mura; Kiyoshi Otaka, Takahagi, all of Japan

[73] Assignee: Hitachi, Ltd., Tokyo, Japan

[21] Appl. No.: 08/680,851

[22] Filed: Jul. 16, 1996

[30] Foreign Application Priority Data

Jul. 17, 1995 [JP] Japan .................................... 7-179787
Sep. 25, 1995 [JP] Japan .................................... 7-245759

[51] Int. Cl.[6] .................................................. H01M 10/39
[52] U.S. Cl. .......................................... 429/104; 429/176
[58] Field of Search ...................................... 429/104, 176

[56] References Cited

U.S. PATENT DOCUMENTS 4,216,275   8/1980   Hartmann et al. ...................... 429/104

FOREIGN PATENT DOCUMENTS

| | | |
|---|---|---|
| A-48-43129 | 6/1973 | Japan . |
| A-56-130071 | 10/1981 | Japan . |
| A-57-57861 | 4/1982 | Japan . |
| 57-180084 | 11/1982 | Japan . |
| A-59-165378 | 9/1984 | Japan . |
| 61-10881 | 1/1986 | Japan . |
| A-2-142065 | 5/1990 | Japan . |
| 2144858 | 6/1990 | Japan . |

*Primary Examiner*—John S. Maples
*Attorney, Agent, or Firm*—Antonelli, Terry, Stout & Kraus, LLP

[57] ABSTRACT

A highly reliable sodium-sulfur battery includes a cell container for the positive electrode which is hardly deteriorated by corrosion. The cell container for the positive electrode is made of a Co base alloy containing Cr, Ni, and Mo, wherein carbide containing at least one of Cr, W, and Mo is precipitated, or the cell container for positive electrode is assembled by integrating plural members made of a high corrosion resistance alloy containing Cr by welding, and a readily deformable portion is provided to the cell container for positive electrode, whereby the reliability of the sodium-sulfur battery can be significantly improved.

28 Claims, 3 Drawing Sheets

SODIUM-SULFUR BATTERY, AND A BATTERY SYSTEM USING SAME

BACKGROUND OF THE INVENTION

The present invention relates to a sodium-sulfur battery having a high reliability, which battery is suitable for various battery systems, such as those found in power storage equipment, electric vehicles, emergency power supplies, uninterruptible power supplies, a peak shift apparatus for electric power systems, frequency-voltage stabilizers, and other equipment, and to a battery system using the same.

A sodium-sulfur battery using sodium for the negative electrode and sulfur for the positive electrode active material has received widespread attention, because of its preferable efficiency and large energy density, and this type of battery is expected to be useful for power storage systems, electric vehicles, and other applications. However, the sodium-sulfur battery has a problem in that corrosive sulfur and sodium polysulfide cause corrosion of the cell container for the positive electrode, resulting in deterioration of the characteristics of the battery, which becomes a barrier to practical use of this battery. That is, the sodium-sulfur battery has a problem in that, when the surface of the metallic vessel forming the cell container for the positive electrode, which is made of a metal, such as stainless steel, is corroded by sulfur and sodium polysulfide, the sulfur, which is a positive electrode active material, is consumed in the formation of corrosion products, and the amount of the positive electrode active material necessary for the battery reaction is decreased, to thereby lower the battery capacitance. Further, there is another problem in that an effect of the electrical resistance of the metallic sulfide generated at the surface of the positive electrode increases the internal resistance of the battery, to thereby lower the efficiency of the battery. In order to solve these problems, various methods, wherein the inner wall of the cell container for the positive electrode is coated with a corrosion resistant coating agent composed mainly of Cr, Mo, Ti, Al, C and so on, have been disclosed. However, because of peeling due to thermal cycles and defects in the coating layer, the reliability of the coating is not sufficient in comparison with a case when a bulk material is used for the cell container for the positive electrode. For instance, JP-A-2-142065 (1990) discloses a cell container for the positive electrode made of an aluminum alloy, for instance, the surface of which is coated with a cobalt base alloy film containing 20~40 wt. % Cr, 1~3 wt. % C, and other materials by a plasma spraying method. The above case, wherein the surface of the cell container for the positive electrode was coated with a corrosion resistant Co base alloy film, had problems in that the adhesion and the durability of the coating film fluctuated readily because the manufacturing method is complex, and so the reliability was not sufficient because sometimes the coating film was peeled off during the assembling of the battery and during its operation. The coating alloy layer formed by the plasma spraying method readily absorbs gases generated from the molten metal, because the coating film is formed by solidification of molten metal. Thus, the alloy layer has a susceptibility to swelling or peeling off due to the partial pressure of the gases in response to a temperature rise during operation of the battery. Once the swelling or the peering occurs, the cell container for the positive electrode, which is made of an aluminum alloy, forms an insulating film by contacting the molten sodium polysulfide, and a problem occurs in that the efficiency of current collection from the cell container for the positive electrode decreases. Further, when an aluminum alloy is used for fabricating the cell container for the positive electrode, the carbon contained in the Co base alloy layer formed by the plasma spraying method reacts with the aluminum base material of the positive electrode with the heat produced during the plasma spraying to generate aluminum carbide ($Al_4C_3$). The carbide reacts with water in the atmosphere to generate methane by a reaction shown by the following equation:

Therefore, handling of the cell container for the positive electrode in the atmosphere causes peeling off and deterioration of the alloy layer. Accordingly, consideration must be given to the fact that an operation for assembling the cell container for the positive electrode into the battery must be performed in an inert atmosphere, but this is deemed a disadvantage from the point of view of mass production of the battery.

Once $Al_4C_3$ is generated, the alloy layer is susceptible to peeling off due to stress generated by the assembling or operation of the battery because of the brittleness of $Al_4C_3$. As examples of using a bulk metallic material for the cell container for the positive electrode, various cases using Fe alloys containing a large amount of Cr have been disclosed, for instance, in JP-A-59-165378 (1984), JP-A-57-57861 (1982), and JP-A-56-130071 (1981). In preparing a cell container for the positive electrode using the above metallic material, welding is the most preferable method for finally sealing the cell container for the positive electrode from the point of view of reliability and operability. However, with the welding method of the prior art, the corrosion resistance of the material at the welding portion became worse than the bulk material. Accordingly, there was a problem in that the actual corrosion rate of the cell container for the positive electrode by sulfur and sodium polysulfide became faster than a value expected from a result of an experimental corrosion test. As a result, insufficient reliability of the batteries and reduction of the life expectancy because of a change in the corrosion resistant property depending on a variation in the welding conditions have remained as problems to be solved. Examples using welding for a Fe group cell container for the positive electrode were disclosed in JP-A-2-144858 (1990), JP-A-61-10881 (1986), and JP-A-48-43129 (1981). A corrosion resistant coating material was used for the cell container for the positive electrode disclosed in JP-A-2-144858 (1990). However, the corrosion resistant property of the material at the welding portion decreased significantly due to melting of the coating layer during the welding, and the low reliability of the battery was a problem which remained to be solved. On the other hand, JP-A-61-10881 (1986) disclosed a positive electrode lid made of stainless steel, Fe—Cr—Al alloy, or Fe coated with Al, and a positive electrode supplementary lid made of stainless steel, Fe—Cr—Al alloy, or Fe—Cr—Al—Y alloy. However, that disclosure did not suggest any material for the battery vessel, which was a key component of the cell container for the positive electrode, nor any content of Cr and C of the Fe alloy composing the positive electrode lid, which was another key component of the cell container for the positive electrode, and the positive electrode supplementary lid. In accordance with JP-A-48-43129 (1973), SUS 304 (Cr 18~20 wt. %, Ni 8~10.5 wt. %, Fe balance) was used as a material for the cell container for the positive electrode. Although SUS 304 has a preferable weldability, a sufficient reliability can not be obtained because of its poor corrosion resistant property against sulfur. The Fe alloy has a larger residual strain at the welding portion and a smaller corrosion resistance in comparison with a Co base alloy and Ni base alloy, and the specific resistivity of ferrous sulfide, which is a corrosion product of the Fe alloy, is higher than that of cobalt sulfide and nickel sulfide, and so the battery resistance readily increases. Therefore, in order to fabricate a reliable cell container for the positive electrode using a welding method, the composition of the Fe alloy used in the fabrication must be restricted exactly to a suitable range. However, prior approaches have not considered the above restriction exactly.

SUMMARY OF THE INVENTION one of the objects of the present invention is to provide a sodium-sulfur battery which is reliable and will scarcely experience deterioration of its characteristics with corrosion of the cell container for the positive electrode, by eliminating the above defects of the prior art.

Another object of the present invention is to provide battery systems using the above sodium-sulfur battery, such as for reliable power storage equipment, electric vehicles, emergency power supplies, uninterruptible power supplies, peak shift apparatus for electric power systems, frequency-voltage stabilizers, and other applications.

In order to realize the above objects of the present invention, the sodium-sulfur battery of the present invention is provided, which comprises a cell container for the negative electrode containing sodium, a cell container for the positive electrode containing a positive electrode mold composed of sulfur or sodium polysulfide, a sodium ion conductive solid electrolyte separating the negative electrode from the positive electrode, and an insulating member fixed to the cell containers for the negative electrode and the positive electrode and connected to the solid electrolyte, wherein the cell container for the positive electrode is an integrated assembly formed by welding plural members which are composed of high corrosion resistant Co base alloys or Ni base alloys containing Cr, and a mechanism for decreasing the stress from the positive electrode mold to the welding portion.

Particularly, the sodium-sulfur battery of the present invention increases its reliability by providing a readily deformable portion on the cell container for the positive electrode. Cobalt base alloys or Ni base alloys containing Cr are desirable for the cell container for positive electrode, and their preferable range of composition is at least 30 wt. % Co, 18~32 wt. % Cr, and utmost 0.2 wt. % C, or at least 40 wt. % Ni, 18~32 wt. % Cr, and utmost 0.2 wt. % C. These alloys are highly desirable when further contain 3~15 wt. % W, 1~10 wt. % Mo, or 0.2~4 wt. % Al.

Regarding the material for forming the cell container for the positive electrode, an alloy containing Fe as a main component, 22~32 wt. % Cr, and at most 0.2 wt. % C can be used instead of the Co base alloy and the Ni base alloy. The alloy further desirably contains 14~22 wt. % Ni, and preferably contains 23~30 wt. % Cr.

Cobalt base alloys or Ni base alloys containing Cr are desirable for the cell container for positive electrode, and their preferable range of composition is at least 30 wt. % Co, 18~32 wt. % Cr, and utmost 0.2 wt. % C, or at least 40 wt. % Ni, 18~32 wt. % Cr, and utmost 0.2 wt. % C. These alloys are highly desirable when further contain 3~15 wt. % W, 1~10 wt. % Mo, or 0.2~4 wt. % Al.

Regarding Fe alloys, two-phase stainless steel composed of austenite and ferrite, and ferritic stainless steel containing a large amount of Cr can be used. The above Fe alloys preferably further contain 1~10 wt. % Mo.

One of the features of the sodium-sulfur battery of the present invention is in forming the cell container for the positive electrode with a Co base alloy containing Cr and C, or Cr, Ni, and C, and further containing W or Mo, wherein the plate shape material or pipe shape material of the Co base alloy is treated with an aging treatment to generate a precipitation effect. Therefore, high corrosion resistant $M_6C$ group carbides, or $M_{23}C_6$ group carbides of Cr, W, and Mo are precipitated finely in the base material. Because of the high corrosion resistance of the above material in this case, the mechanism or readily deforming portion described previously to decrease stress are not necessarily required. A suitable aging treatment for precipitating the carbides is performed at a temperature in a range of 500~1000° C. for at least 10 hours. The Co base alloy desirably contains at least 30 wt. % Co, 18~28 wt. % Cr, and 0.05~0.20 wt. % C, or 18~28 wt. % Cr, 15~25 wt. % Ni, 3~15 wt. % W or Mo, and 0.05~0.20 wt. % C. Further, the Co base alloy can contain at least one element selected from a group consisting of Fe, Si, Mn, and La.

Practically, the following batteries are preferable:

(1) Sodium-sulfur battery using a cell container for the positive electrode composed of plates and pipes made of a Co base alloy including Cr and C, or Cr, Ni, and C, and W or Mo, wherein a carbide, including at least one element selected from a group consisting of Cr, W, and Mo, is precipitated;

(2) Sodium-sulfur battery as described in the above paragraph (1), of which the contents of Cr and C, or Cr, Ni, and W or Mo, and C in the Co base alloy, wherein carbide including at least one element selected from a group consisting of Cr, W, and Mo, is precipitated, are in a range of 18~28 wt. % Cr, and 0.05~0.20 wt. % C, or 18~28 wt. % Cr, 15~25 wt. % Ni, or 3~15 wt. % W or Mo, and 0.05~0.20 wt. % C;

(3) Sodium-sulfur battery as described in the above paragraph (1), of which the carbide in the Co base alloy, wherein the carbide including at least one element selected from a group consisting of Cr, W, and Mo is precipitated, has a spherical shape of, at the utmost, 5 $\mu$m in diameter, and an area rate of the carbide is in a range of 20~80%;

(4) Sodium-sulfur battery using a cell container for the positive electrode composed of a Co base alloy, wherein at least a Cr carbide of, at the utmost, 5 $\mu$m in diameter is precipitated in the Co base alloy by being subjected to an aging treatment on plates and pipes made of the Co base alloy, including Cr and C, or Cr, Ni, and C, and W or Mo at a temperature in a range of 500~1000° C. for at least 10 hours; and (5) Sodium-sulfur battery, wherein a cell container for the positive electrode and a cell container for the negative electrode are separated by a tube made of a beta-alumina group solid electrolyte haying a sodium ion conductivity, the cell container for the positive electrode contains molten sulfur or a sulfur compound (sodium polysulfide), and the cell container for the negative electrode contains molten sodium, and further the cell container for the positive electrode is composed of a Co base alloy containing the carbide at least one element selected from a group consisting of Cr, W, and Mo.

Furthermore, the battery systems of the present invention are characterized in that they are applicable to power storage equipment, electric vehicles, emergency power supplies, uninterruptible power supplies, peak shaft apparatus for electric power systems, and frequency-voltage stabilizers using the sodium-sulfur battery of the present invention.

In accordance with various investigations performed by the present inventors, it was revealed that the efficiency and capacitance of a battery were deteriorated by dissolving metallic components of the cell container for the positive electrode into the positive electrode mold with progress of corrosion at the welded portion even if the welded portion did not directly contact the positive electrode mold; and decreasing the stress to the vessel, in addition to an increase in corrosion resistance by increasing the Cr content in the material composing the cell container for the positive electrode, was effective in preventing the cell container for the positive electrode of the sodium-sulfur battery from corroding. The reason is that a stable chromium sulfide layer is formed on the surface of the vessel, if a large amount of chromium is contained therein, and subsequent corrosion can be suppressed and a stable chromium sulfide layer can be maintained without peeling, if the stress is small.

The cell container for the positive electrode must contain a positive electrode mold inside and be sealed. In consideration of the high vapor pressure of sulfur and sodium polysulfide at a high temperature, a plurality of members are preferably integrated by welding and sealed, in view of reliability and workability. However, when a metallic material containing a large amount of chromium was used as the material for the positive electrode, it was found that the carbon added to the metallic material, or the carbon contained therein, unavoidably reacted with the chromium during the welding operation, and generated carbides were precipitated at the welding portion to cause a residual stress and undesired effects on the corrosion resistance. That means that the metal was heated locally during the welding operation, and various levels of heat treatment of the metal were performed depending on the distance from the welded boundary. As a result, the precipitation condition of the chromium carbides and metallic texture tend to change depending on the location, and the generated heterogeneity in the texture is considered to cause a residual stress. It was revealed that, when operations for elevating the temperature and applying a cooling procedure were performed alternately with the cell container for the positive electrode having such a residual stress, the chromium sulfide layer formed on the surface of the vessel was readily peeled off by the residual stress, in addition to a stress generated from the positive electrode mold due to the temperature change, and the corrosion resistance was deteriorated. In a case of general welding, the residual stress can be decreased by heat treatment before and/or after the welding. However, in a case of a sodium-sulfur battery, the temperature of the heat treatment before and/or after the weld-sealing is restricted because of the vapor pressure and corrosive property of sulfur and sodium polysulfide, and the residual stress can not be decreased thoroughly.

The present invention has given consideration to and is based on the above findings, and the features of the present invention will be explained hereinafter referring to FIGS. 1 and 2.

Figure 1:
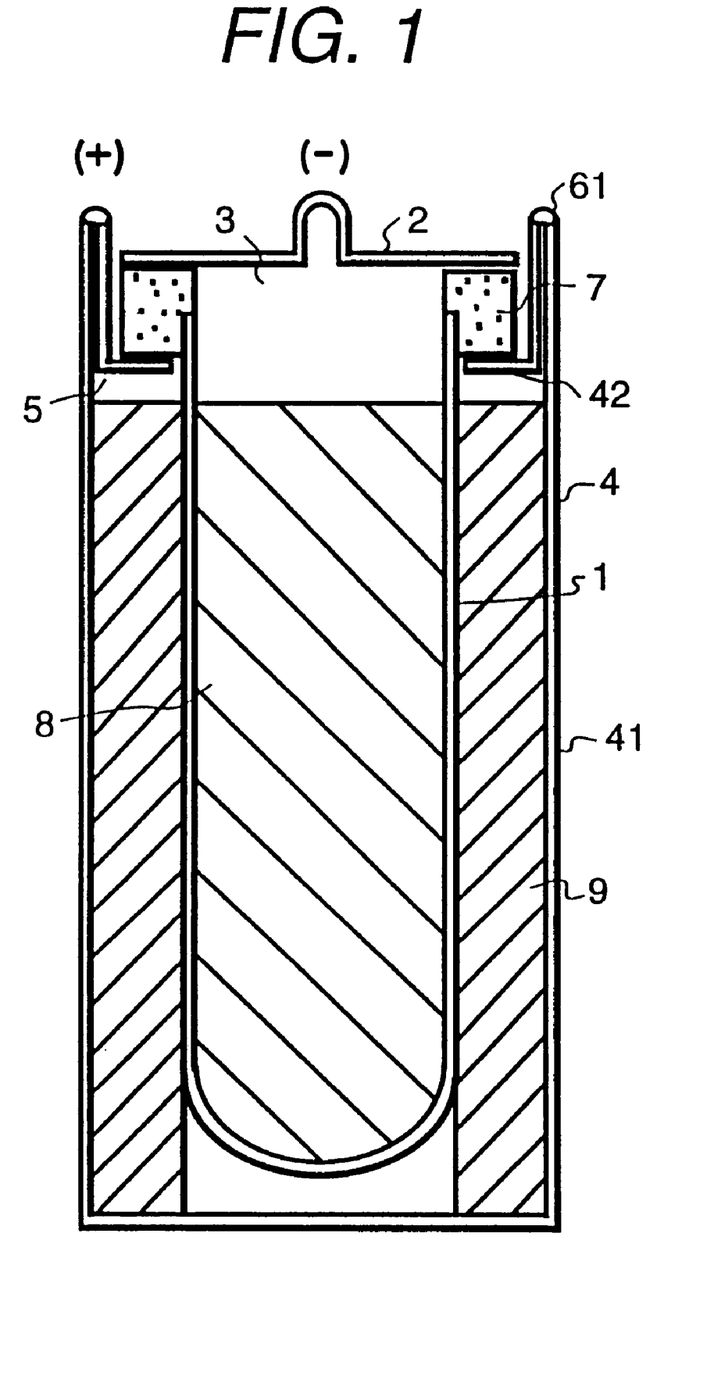
FIG. 1 is a schematic cross section of a battery relating to the present invention.

FIG. 1 is a schematic cross section indicating an example of a structure of the sodium-sulfur battery relating to the present invention. The numeral 1 in FIG. 1 indicates a tube of sodium ion conductive solid electrolyte, 2 designates a cell container for the negative electrode composing a negative electrode chamber 3 with the tube of the solid electrolyte 1, and 41, 42 denote members of the cell container for the positive electrode 4 forming a positive electrode chamber 5 with the tube of the solid electrolyte 1. The numeral 61 indicates a welded portion of the members 41, 42. The numeral 7 indicates an insulator which insulates the cell container for the negative electrode 2 from the cell container for the positive electrode 4, the insulator being connected to both of the above vessels. Generally, the insulator 7 and the opening of the tube of the solid electrolyte 1 are mutually joined by glass soldering or other methods. The numeral 8 indicates sodium contained in the negative electrode chamber 3, and 9 denotes a positive electrode mold composed of sulfur and sodium polysulfide, which is generally impregnated into carbon fiber and other materials and is contained in the positive electrode chamber 5.

Figure 2:
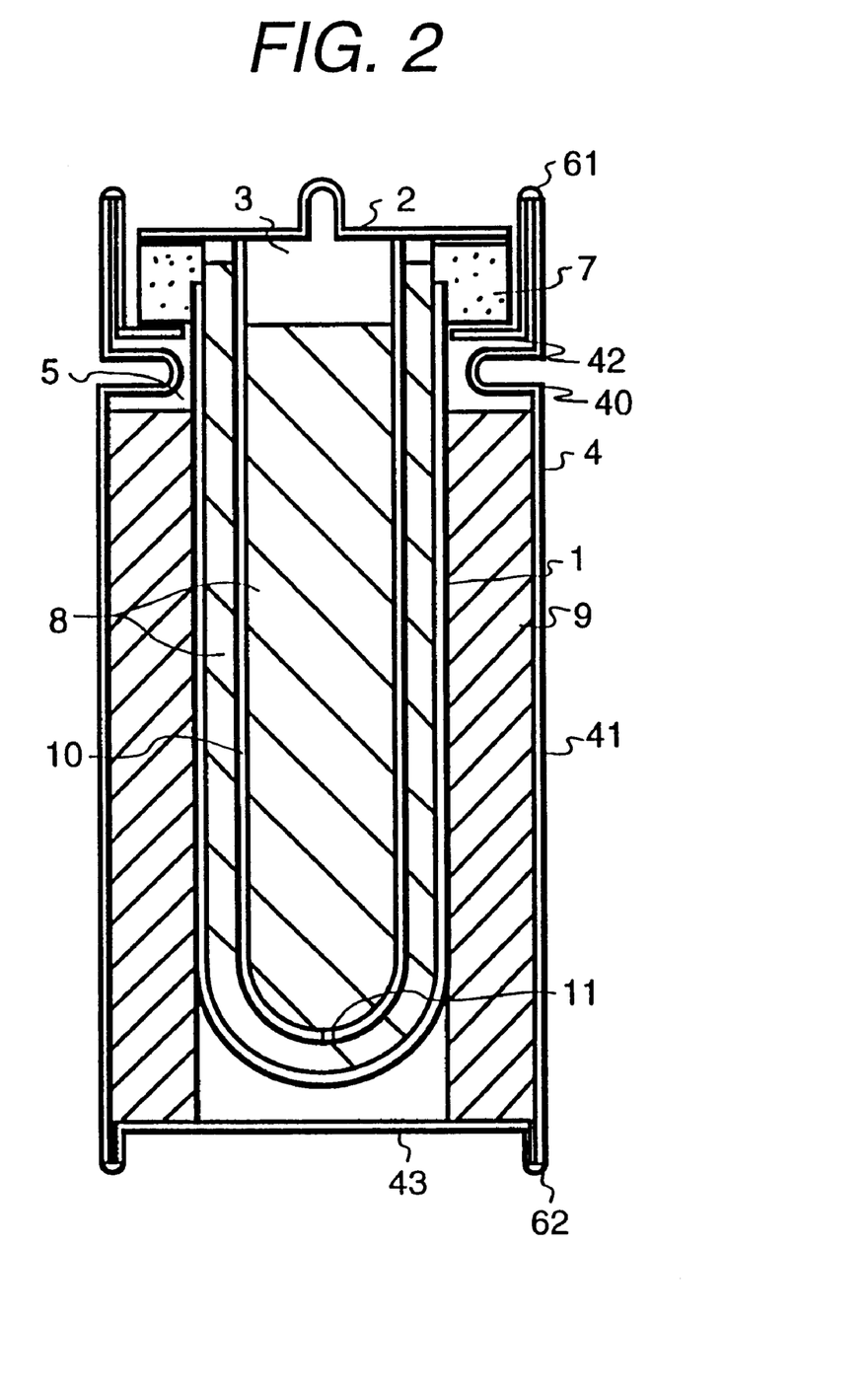
FIG. 2 is another schematic cross section of a battery relating to the present invention.

Referring to FIG. 2, the members which are the same as members in FIG. 1 have the same reference numerals. The numeral 43 in FIG. 2 indicates a member which forms the cell container for the positive electrode 4, and this member 43 is connected to the member 41 at the welded portion 62. The numeral 40 indicates a readily deformed portion, such as a bellows, provided in the cell container for the positive electrode 4. The numeral 10 indicates a sodium vessel provided in the cell container for negative electrode chamber 3, and sodium 8 is supplied into the solid electrolyte tube 1 through a through hole 11.

Regarding the above structure, the members 41, 42, 43 of the cell container for the positive electrode are composed of a high corrosion resistant metallic material containing a large amount of Cr, and are integrated by welding. The member 42 is located inside the member 41, and restricts inward deformation in a direction of the member 41 which is caused by elongation and shrinkage of the positive electrode mold due to elevating temperature or cooling, and a change in volume with a phase change of the sodium polysulfide, in order to decrease the stress added to the welded portion 61. The same effect can also be achieved with the member 43 by restricting the inward deformation in a direction of the member 41 in order to decrease the stress added to the welded portion 62. Further, the stress added to the welded portion 61, 62 also can be decreased by restricting the outward deformation of the cell container for the positive electrode by providing a rigid ring (not shown in the figure) at a lower outside position of the welded portion 61 or an upper outside position of the welded portion 62 of the cell container for the positive electrode.

The member 42 has an L-shape in cross section and is readily deformed at the angle of the L-shape to absorb a difference in thermal shrinkage of the tube of the solid electrolyte 1 and the cell container for the positive electrode 4 after the positive electrode mold has solidified. Therefore, a further decrease of the stress on the welded portion 61 added by elevating the temperature and cooling can be realized. The same effect can be observed by providing bellows 40 in the cell container for the positive electrode, and a significant decrease of the stress added to the welded portion 61 can be realized by deformation of the bellows. The bellows 40 and the member 42 are preferably provided at a position where the bellows and the member do not touch the positive electrode mold 9. If the bellows and the member touch the positive electrode mold 9, the deformation of the bellows and the other members are restricted by the solidified positive electrode mold, and the effect produced by the deformation to decrease stress is reduced.

In accordance with the present invention, the chromium sulfide layer formed on the surface of the vessel can be maintained, even if a residual stress is generated by the precipitation of chromium carbides during the welding of the members, which are composed of a high corrosion resistant metallic material containing a large amount of chromium, because the stress added to the welded portion is small. As a result, the corrosion resistance of the cell container for the positive electrode can be maintained at a high level, and the reliability of the sodium-sulfur battery can be significantly improved. The material forming the cell container for the positive electrode must have a preferable workability and weldability in addition to a preferable corrosion resistance. If the above condition is not satisfied, a preferably reliable battery can not be obtained. For instance, if a material of poor corrosion resistance, such as a Fe alloy containing a small amount of Cr, or a coated material, are used as the material for the tube of the positive electrode, the objective effect can not be realized due to deficiency of the corrosion resistance of the material itself and the welded portion. Further, the material which readily generates residual stress at the welded portion is undesirable, because the chromium sulfide layer formed on the surface of the vessel can not be maintained in a stable state.

The material forming the cell container for the positive electrode of the present invention is preferably a Co base alloy or a Ni base alloy. The above alloys are advantageous, because they have a smaller residual stress generated during welding and a larger corrosion resistance in comparison with the Fe alloys which are conventionally used.

Another advantage is that the electrical resistance of the sulfides formed on the surface of the vessel is smaller than that of the Fe alloy, and accordingly, the characteristics of the battery are stable, and the reliability of the battery is further improved. Particularly, in the case using a Co base alloy, the solubility of formed cobalt sulfide in the sodium polysulfide is smaller than that of nickel sulfide, and accordingly, the reliability of the battery can be particularly improved.

A preferable range of composition of the Co base alloy and the Ni base alloy is at least 30 wt. % Co, 18~32 wt. % Cr, and at most 0.2 wt. % C, or at least 40 wt. % Ni, 18~32 wt. % Cr, and at most 0.2 wt. % C. If the content of Co or Ni is less than the above range, the advantages of the Co base alloy or the Ni base alloy is reduced. If the content of Cr is less than the above range, the corrosion resistance is decreased. On the other hand, if the content of Cr is more than the above range, fabrication of the cell container for the positive electrode becomes difficult. If the content of C is more than the above range, not only will fabrication of the cell container for the positive electrode become difficult, but also the corrosion resistance will be decreased, because the amount of precipitated chromium carbide during welding increases and the residual stress increases. If the Co base alloy and the Ni base alloy contain 3~15 wt. % W, 1~10 wt. % Mo, or 0.2~4 wt. % Al, the alloys are particularly preferable because the corrosion resistance further increases. If the contents of W, Mo, and Al are smaller than the above range, the effect of the addition can not be sufficiently obtained, and if larger than the above range, fabrication of the cell container for the positive electrode becomes difficult.

As for the material used for the cell container for the positive electrode of the present invention, a Fe alloy composed of Fe as a main component, 22~32 wt. % Cr, and at most 0.2 wt. % C, can be used. If the content of Cr is smaller than the above range, the corrosion resistance decreases, and if the content of Cr is larger than the above range, the fabrication of the cell container for the positive electrode becomes difficult. If the content of C is more than the above range, not only will fabrication of the cell container for the positive electrode become difficult, but also the corrosion resistance is decreased, because the amount of precipitated chromium carbide during welding increases and the residual stress increases. If the Fe alloy contains 14~24 wt. % Ni, additional advantages, such as a decrease in the residual stress generated during the welding and an improved corrosion resistance, are realized. Use of two phase stainless steel composed of austenite and ferrite as the Fe alloy is also effective for decreasing the residual stress and improving the corrosion resistance. When a two phase stainless steel or a ferritic stainless steel is used, advantages are achieved in that the thermal expansion becomes smaller than in a case when austenitic stainless steel is used, and accordingly, little thermal strain is added to the welded portion. The content of 23~30 wt. % Cr is desirable for making the corrosion resistance and workability compatible, and this is particularly preferable in practical use. Another advantage, such as improvement in corrosion resistance against sulfur without harming the workability, can be realized with use of a Fe alloy containing 1~10 wt. % Mo.

Practically, SUS 310S (24~26 wt. % Cr, 19~22 wt. % Ni, balance Fe), SUS 329J (23~28 wt. % Cr, 3~6 wt. % Ni, 3 wt. % Mo, balance Fe), SUS 427J (28.5~32 wt. % Cr, 2 wt. % Mo, balance Fe), and the like can be used.

As a result of investigation by the present inventors, it was revealed that a reliable sodium-sulfur battery could be obtained by using a cell container for the positive electrode composed of a Co base alloy, which was manufactured by performing a solution heat treatment on materials of plates and pipes which are composed of a Co base alloy containing Cr and C, or Cr, Ni, W or Mo, and C of an appropriate range in composition, and subsequently, precipitating fine $M_6C$, $M_{23}C_6$ group carbides of at least Cr, W, and Mo by an aging heat treatment, without need for the stress reducing mechanism or the readily deforming portion of the cell container for the positive electrode, because of significantly improved corrosion resistance. In this case, plastic working to form pipes is facilitated, and additionally, the weldability is improved and fabrication of the cell container for the positive electrode becomes easy. The cell container for the positive electrode manufactured by the above process can be improved significantly in reliability in comparison with one having a corrosion resistant coating, because the base material itself has a preferable corrosion resistance. The Co base alloy of the present invention, wherein fine $M_6C$, $M_{23}C_6$ group carbides of at least Cr, W, and Mo are precipitated in a matrix of a Co base alloy containing Cr and C, or Cr, Ni, W or Mo, and C, is superior in not only corrosion resistance, but also is advantageous in preventing a decrease in the efficiency of the battery, because the electric resistance of the cobalt sulfide formed on the surface of the alloy by a reaction with sulfur is low. The desirable ranges of composition of the material for the Co base alloy, when the above $M_6C$, $M_{23}C_6$ group carbides are precipitated, are at least 30 wt. % Co, 0.05~0.20 wt. % C, 18~28 wt. % Cr, desirably 15~25 wt. % Ni, and 3~15 wt. % W or Mo. The ranges of composition of the alloy were restricted for the following reason.

Carbon (C) in the Co base alloy of the present invention forms a solid solution in Co when melted and a stabilized austenitic phase, but C forms fine $M_6C$, $M_{23}C_6$ group carbides by aging heat treatment after the solution heat treatment. Therefore, C contributes to improved mechanical strength in addition to an improved corrosion resistance. However, if the amount of C is excessive, C combines to form large grains of the above carbides to decrease the ductility and disturb the hot forging operation. Therefore, the C content must be restricted to a range of 0.05~0.20 wt. %. A larger amount of Cr improves the corrosion resistance and the strength by precipitating Cr carbide, or complex carbides of Cr, W, and Mo, decreases ductility. Furthermore, a hot forging operation becomes difficult. Therefore, the Cr content must be restricted to a range of 18~28 wt. %. Tungsten (W) or molybdenum (Mo) contributes to precipitation of fine $M_6C$, $M_{23}C_6$ group carbides in response to an aging heat treatment, and W or Mo is effective in improving the corrosion resistance. However, if W or Mo is excessive, the workability is decreased. Accordingly, the content of W or Mo must be restricted to a range of 3~15 wt. %. Nickel (Ni) contributes to form an austenitic structure, which is superior in strength and corrosion resistance, in the alloy. In order to form the austenitic structure, the coexistence of at least 15 wt. % Ni and at least 18 wt. % Cr is necessary. However, if Ni is excessive, Ni forms an intermetallic compound with Co so as to become brittle. The Co base alloy containing Cr, Ni, and W or Mo, and C of the present invention can contain at least one element selected from a group consisting of Si, Mn, Fe, and La. Iron (Fe) is contained in the alloy as an impurity. However, if the content of Fe is excessive, the corrosion resistance of the alloy is decreased significantly. Therefore, the content of Fe is desirably restricted to, at the utmost, 4 wt. %. Silicon (Si) is added to the alloy in a melting operation as a deoxidizing agent and is effective in improving the oxidation resistant property of the alloy. However, if Si exists excessively, the toughness and hot workability of the alloy are decreased. Therefore, the content of Si is desirably restricted to, at the utmost, 0.4 wt. %. Manganese (Mn) is added to the alloy as a deoxidizing agent, as well as Si, and additionally, Mn increases the solid solubility of the additive elements by coexisting with Ni to help precipitating desirable carbides, thereby improving the corrosion resistance, toughness, and hot workability. However, when the content of Mn increases, the molten alloy corrodes the ladle bricks in a melting operation, and the contamination of the alloy with impurities occurs readily. Therefore, the content of Mn is desirably restricted to, at the utmost, 1.5 wt. %. Lanthanum (La) has an effect to make the alloy passive and to increase the corrosion resistance. However, if La exists excessively, the hot workability of the alloy is disturbed. Therefore, the content of La is desirably restricted to a range of 0.01~0.10 wt. %. The aging heat treatment under 500° C. does not have any effect to precipitate the above carbides. If the temperature of the aging heat treatment exceeds 1000° C., the carbides grow to be coarse. Accordingly, this results in a decrease in the corrosion resistance and a lowering of the strength. In view of this, the condition of the aging heat treatment is desirably determined to be a temperature in a range of 500~1000° C., for a time of at least 10 hours. In accordance with the present invention, the above carbides are fine and spherical, which is preferable for improving strength. However, the size of the carbide precipitated in the base material of the alloy is desirably restricted to, at the utmost, 5 µm, and the area rate is desirably restricted to a range of 20~80%. The reason is that, if the size of the carbide exceeds 5 µm, the alloy becomes brittle and the plastic workability is disturbed. If the area rate is smaller than 20%, the improvement in corrosion resistance is not realized. If the area rate exceeds 80%, the corrosion resistance can be improved, but the alloy becomes brittle and loses ductility, and the plastic workability is disturbed. The area rate of the carbide precipitated in the base material can be controlled by varying the additive amount of carbon, and the temperature and time of the aging treat treatment. That means, in order to reduce the area rate of the carbide, the additive amount of carbon should be decreased, the temperature of the aging heat treatment should be lowered, and the time of the aging heat treatment should be shortened. On the contrary, an increase of the area rate of the carbide can be realized by increasing the additive amount of carbon, elevating the temperature of the aging heat treatment, and extending the time of the aging heat treatment.

By using the sodium-sulfur battery relating to the present invention, the reliability of a battery system can be improved, and highly reliable power storage equipment, electric vehicles, emergency power supplies, uninterruptible power supplies, peak shift apparatus for electric power systems, frequency-voltage stabilizers, and other equipment and systems can be realized.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Hereinafter, embodiments of the present invention will be explained with reference to drawings.

(Embodiment 1)

A solid electrolyte tube shown in FIG. 2, which was made of a lithium doped β"-alumina sintered body, was used as the solid electrolyte tube 1. Then, α-alumina, an insulator 7, was fixed to the solid electrolyte tube 1 by glass bonding; and, the insulator, a cell container for negative electrode 2, and a member 42 of a cell container for the positive electrode were joined by thermo-compression bonding using an aluminum-silicon-magnesium group alloy foil. The negative electrode vessel 2 and the sodium vessel 10 were made of SUS 304 stainless steel. The sodium vessel containing sodium 8 and nitrogen gas of about 0.1 atmosphere was sealed so that the sodium would leak outside through a small hole 11 of 0.2 mm in diameter located at the lower portion of the sodium vessel to cover the inner surface of the solid electrolyte tube. On the other hand, members 41, 42, 43, made of the materials shown in Table 1 to compose the cell container for the positive electrode, were integrated by TIG welding or electronic beam welding. The sodium-sulfur battery having the structure shown in FIG. 2 was obtained by loading the cell container for the positive electrode with a positive electrode mold composed of sulfur and carbon fiber mat, filling it with nitrogen gas of about 0.1 atmosphere, and sealing it with a bottom lid (the member shown by 43 in FIG. 2) by TIG welding under reduced pressure. The size of the cell container for the positive electrode was about 65 mm in diameter, and about 1.5 mm thick. The rigidity in an axial direction of the bellows 40 provided in the cell container for the positive electrode was about 10N/mm.

Figure 3:
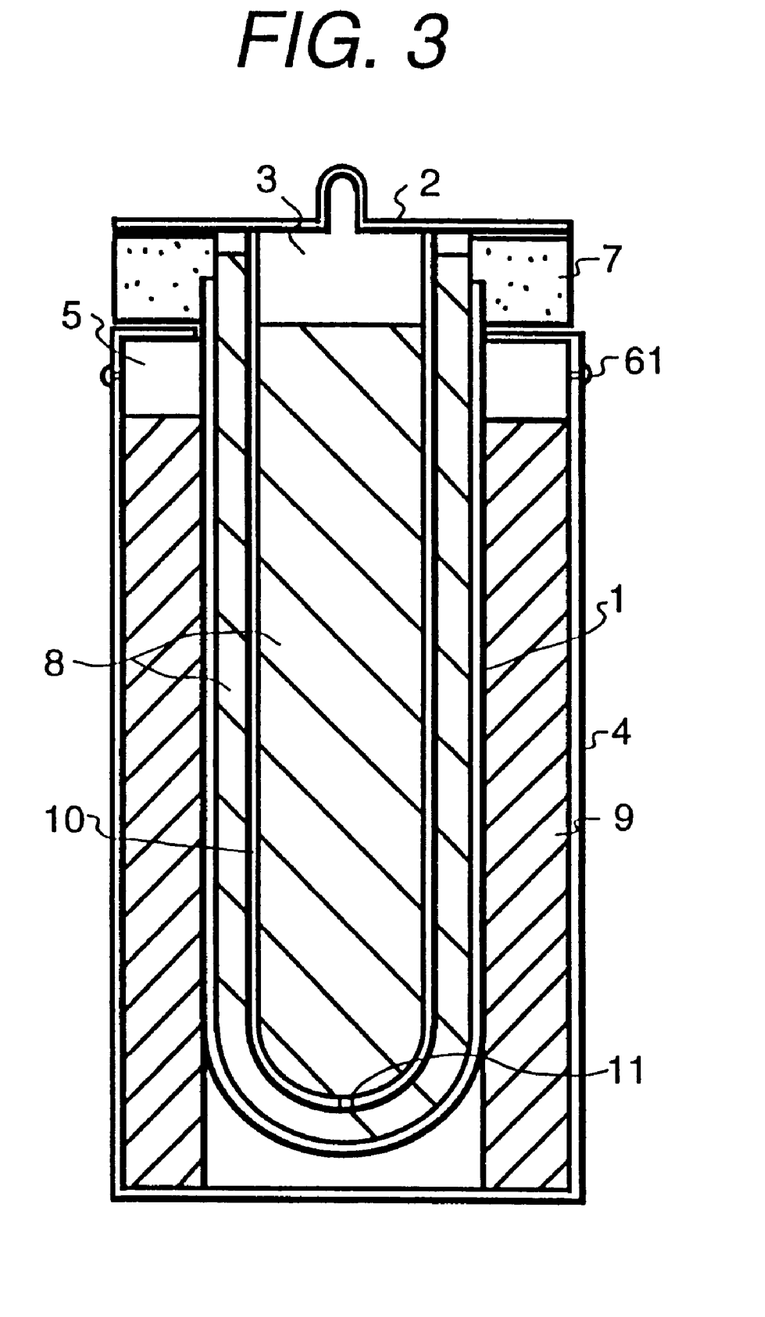
FIG. 3 is a schematic cross section of a battery forming a comparative example.

In accordance with the same method, a battery having a structure shown in FIG. 1 provided with the same sodium vessel as the one shown in FIG. 2, and a battery having a structure shown in FIG. 3 as a comparative example, were manufactured. The rigidity in an axial direction of the cell container for the positive electrode shown in FIG. 1, which was not provided with a bellows, was about 25N/mm, and the rigidity in an axial direction of the cell container for the positive electrode shown in FIG. 3 was about 150N/mm. The respective batteries were repeatedly charged and discharged 500 times with a current density of 200 mA/cm$^2$ per current-carrying area of the solid electrolyte tube at 400° C., and the efficiencies of the batteries and the change rate in capacitance, were observed. The results are shown in Table 1.

TABLE 1

| Sample | Structure Drawing | Bellows | Composition (wt. %) Cr | Co | Ni | Fe |
|---|---|---|---|---|---|---|
| 1 | FIG. 2 | yes | 22 | 39 | 22 | 3 |
| 2 | 1 | no | 22 | 39 | 22 | 3 |
| 3 | 2 | yes | 19 | 71 | — | — |
| 4 | 2 | yes | 28 | 51 | — | 20 |
| 5 | 2 | yes | 22 | 1.5 | 47 | 19 |
| 6 | 1 | no | 22 | 1.5 | 47 | 19 |
| 7 | 2 | yes | 20 | — | 68 | 2.5 |
| 8 | 2 | yes | 30 | 2 | 43 | 15 |
| 9 | 2 | yes | 19 | 14 | 57 | 0.3 |
| 10 | 2 | yes | 25 | — | 20 | 54 |
| 11 | 1 | no | 24 | — | 5 | 67 |
| 12 | 2 | yes | 30 | — | — | 67 |
| Comparative example C-1 | 3 | no | 22 | 39 | 22 | 3 |
| C-2 | 3 | no | 22 | 2.5 | 46 | 20 |
| C-3 | 3 | no | 19 | — | 9 | 72 |
| C-4 | 2 | yes | 19 | — | 9 | 72 |

| Sample | Composition (wt. %) C | Mo | W | Al | Efficiency, Change rate | Capacitance, Change rate |
|---|---|---|---|---|---|---|
| 1 | 0.1 | — | 14 | — | ◎ | ◎ |
| 2 | 0.1 | — | 14 | — | ◎ | ○ |
| 3 | 0.2 | — | 5 | 4 | ◎ | ◎ |
| 4 | 0.02 | — | — | — | ◎ | ◎ |
| 5 | 0.1 | 9 | 0.6 | — | ◎ | ◎ |
| 6 | 0.1 | 9 | 0.6 | — | ◎ | ○ |
| 7 | 0.05 | 9 | — | 0.2 | ◎ | ◎ |
| 8 | 0.03 | 6.5 | 3 | — | ◎ | ◎ |
| 9 | 0.05 | 7 | — | 2 | ◎ | ◎ |
| 10 | 0.08 | — | — | — | ○ | ○ |
| 11 | 0.12 | 3 | — | 3 | ○ | ○ |
| 12 | 0.005 | 2 | — | — | ○ | ○ |
| Comparative example C-1 | 0.1 | — | 14 | — | Δ | Δ |
| C-2 | 0.05 | 8 | 1 | — | Δ | X |
| C-3 | 0.08 | — | — | — | X | X |
| C-4 | 0.08 | — | — | — | Δ | X |

Remarks: Change rate; ◎: 0~1%, ○: 2~3%, Δ: 5~10%, X: more than 10%

In accordance with the results shown in Table 1, it is clearly revealed that the sodium-sulfur battery of the present invention has stable characteristics and a high reliability. The sample shown in Table 1 as the comparative example C-1 was not treated with the aging heat treatment, which were performed on the samples of Embodiment 2.

(Embodiment 2)

An alloy consisting of a composition such as 0.01~0.30 wt. % C, 15~35 wt. % Cr, 10~30 wt. % Ni, 1~20 wt. % W, 1~16 wt. % Mo, and balance of Co, was melted in a crucible under an inert gas atmosphere. Subsequently, the obtained alloy was forged at a temperature of 1000~1200° C. to form a sample of 15 mm thick, 200 mm wide, and 400 mm long, in order to evaluate hot workability of the alloy itself. The result is shown in Table 2. The table 2 reveals that the Co base alloy generates no cracks in the sample, and realizes a preferable plastic workability with a composition in a range of, at the utmost 0.20 wt. % C, at the utmost 28 wt. % Cr, at the utmost 25 wt. % Ni, at the utmost 15 wt. % W, and at the utmost 15 wt. % Mo in the Co base alloy.

TABLE 2

| Sample No. | Alloy composition (wt. %) | | | | | | Work- ability | Corrosion resistance |
|---|---|---|---|---|---|---|---|---|
| | C | Cr | Ni | W | Mo | Co | | |
| 1 | 0.01 | 22 | 22 | 14 | — | Bal. | ◎ | ○ |
| 2 | 0.05 | 22 | 22 | 15 | — | Bal. | ◎ | ◎ |
| 3 | 0.10 | 22 | 22 | 15 | — | Bal. | ◎ | ◎ |
| 4 | 0.20 | 22 | 22 | — | 14 | Bal. | ◎ | ◎ |
| 5 | 0.30 | 22 | 22 | 14 | — | Bal. | ○ | ◎ |
| 6 | 0.10 | 28 | 23 | 14 | — | Bal. | ◎ | ◎ |
| 7 | 0.10 | 35 | 22 | — | 14 | Bal. | ○ | ◎ |
| 8 | 0.10 | 22 | 22 | — | 16 | Bal. | ○ | ◎ |
| 9 | 0.10 | 22 | 27 | 14 | — | Bal. | ○ | ◎ |
| 10 | 0.10 | 22 | 30 | 14 | — | Bal. | ○ | ◎ |
| 11 | 0.10 | 22 | 22 | 20 | — | Bal. | ○ | ◎ |
| 12 | 0.10 | 18 | 22 | 14 | — | Bal. | ◎ | ◎ |
| 13 | 0.10 | 15 | 22 | 14 | — | Bal. | ◎ | ◎ |
| 14 | 0.10 | 22 | 15 | 14 | — | Bal. | ◎ | ◎ |
| 15 | 0.10 | 22 | 10 | 14 | — | Bal. | ◎ | ○ |
| 16 | 0.10 | 22 | 22 | 5 | 1 | Bal. | ◎ | ◎ |
| 17 | 0.10 | 22 | 22 | 1 | 3 | Bal. | ◎ | ◎ |

Remarks: ◎: Excellent, ○: Good

The obtained alloy was heated to 1180° C. under an inert gas atmosphere for the solution treatment, and subsequently, it was heated to 700° C. for 100 hours for the aging heat treatment. First, a precipitation feature of the carbides of the sample was observed by metallographic examination, and then the corrosion resistance was evaluated. The metallographic examination was performed by the steps of polishing the sample, etching the polished sample with aqua regia, and observing the resulting sample with a scanning electron microscope. The corrosion test was performed by immersing the sample into molten $Na_2S_4$ at 400° C. for 1000 hours. The results of the corrosion tests are shown in Table 2.

The alloy of the present invention consisted of 0.05~0.20 wt. % C, 18~28 wt. % Cr, 15~25 wt. % Ni, 3~15 wt. % W, 3~15 wt. % Mo, and the balance of Co, and it was treated with an aging treatment, and thereafter it was confirmed that fine $M_6C$, $M_{23}C_6$ group carbides, smaller than 2 μm in diameter, of W, Mo, and Cr precipitated in a matrix of a Co base alloy, were formed. The amount of corrosion was less than 0.3 mg/cm$^2$ for all samples, and it was confirmed that the alloy was significantly corrosion resistant even at a high temperature, such as 400° C.

(Embodiment 3)

A Co base alloy having a composition of 0.1 wt. % C, 0.05 wt. % La, 22 wt. % Cr, 22 wt. % Ni, 14 wt. % W, at the utmost 1.5 wt. % Fe, and the balance of Co, (Commercial name HA-188), was treated for solution heat treatment at 1180° C. ×1 hour, and a plate 1.5 mm thick, 210 mm wide, and 400 mm long was formed by cold rolling. Subsequently, an aging heat treatment was performed on the alloy at 500° C., 850° C., and 1000° C. for 500 hours under an inert gas atmosphere. The structures of the above alloys treated with the aging heat treatment and alloys treated only with the solution heat treatment were observed by a scanning electron microscope.

As a result, the alloy treated with the aging heat treatment at a temperature in a range of 500~1000° C. was confirmed to form fine $M_6C$, $M_{23}C_6$ group carbides, smaller than 2 μm in diameter, of W and Cr precipitated in austenite. On the contrary, formation of the carbides was hardly observed in the alloy treated only with the solution heat treatment.

The mechanical properties of the obtained alloys treated with the aging heat treatment at 850° C., and the alloy treated with the solution heat treatment were determined. As a result, the alloy treated with the aging heat treatment having a composition of 0.1 wt. % C, 0.05 wt. % La, 22 wt.

% Cr, 22 wt. % Ni, 14 wt. % W, at the utmost 1.5 wt. % Fe, and the balance of Co, was 100 kg/mm² in tensile strength, 56 kg/mm² in 0.2% yield strength, and 50% in elongation. The alloy treated only with the solution heat treatment was 95 kg/mm² in tensile strength, 55 kg/mm² in 0.2% yield strength, and 56% in elongation. In accordance with the above observation, it was confirmed that the alloy of the present invention, which was subjected to the aging heat treatment and precipitated with carbides of W and Cr, had a relatively high strength, and a preferable ductility.

Furthermore, a plate made of the alloy, which was treated with the same aging heat treatment as described above and which consisted of a composition of 0.1 wt. % C, 0.05 wt. % La, 22 wt. % Cr, 22 wt. % Ni, 14 wt. % W, at the utmost 1.5 wt. % Fe, and the balance of Co, was welded using a TIG welding method. In accordance with an observation of the structure of the welded portion, the integrity of the welded portion was confirmed, and the alloy of the present invention was confirmed to have a preferable weldability.

Corrosion tests were performed on the alloys obtained by the present embodiment, which were the alloys treated with the aging heat treatment, and the alloy treated only with the solution heat treatment, and their corrosion resistance were evaluated. In order to provide a comparison with the above samples, the same corrosion test as described above was performed on a sample which was made of a conventional Al substrate, whereon stelite powder consisting of 28 wt. % Cr, 67 wt. % Co, 1 wt. % C, and 4 wt. % W, was plasma sprayed. The corrosion test was performed by immersing the sample into molten $Na_2S_4$ at 350° C., 400° C. for 1000 hours. The results of the corrosion tests are shown in Table 3.

TABLE 3

| Material of cell container of positive electrode | Reduced amount by corrosion (mg/cm²) | | Reduced Thickness by corrosion (µm) | | | |
| --- | --- | --- | --- | --- | --- | --- |
| | | | 350° C. | | 400° C. | |
| | 350° C. | 400° C. | 1 year | 10 years | 1 year | 10 years |
| The alloy of the present invention, aging treatment | 0 | 0.25 | — | — | 2.4 | 24 |
| The comparative sample, solution treatment | 0 | 0.40 | — | — | 4.0 | 40 |
| Conventional plasma sprayed material | 0.7 | 4.0 | 0.8 | 8 | 40 | 400 |

The alloys obtained by the present embodiment, which were the alloys treated with the aging treat treatment, and the alloy treated only with the solution heat treatment, were not corroded at a temperature as low as 350° C., for 1000 hours. The reduced amount by corrosion at a temperature as high as 400° C., for 1000 hours for the alloys of the present invention, which were the alloys treated with the aging heat treatment, and the alloy treated only with the solution heat treatment, were 0.25 mg/cm², and 0.40 mg/cm², respectively. Therefore, the alloy of the present invention treated with the aging heat treatment was confirmed to have a preferable corrosion resistance even at a high temperature.

If the alloy of the present invention treated with the aging heat treatment is corroded at a constant rate continuously during one year, the thickness reduction due to corrosion, that is a reduced thickness, of the alloy treated with the aging heat treatment can be assumed to be 2.4 µm. The case of the alloy treated only with the solution heat treatment can be assumed to be 4 µm. By simply multiplying these values with the expected life of the battery, i.e. 10 years, the reduced thickness of the alloy treated with the aging heat treatment becomes 24 µm, and of the alloy treated only with the solution heat treatment becomes 40 µm. Therefore, the necessary thickness for the expected life of the battery, i.e. 10 years, can be sufficiently set by providing about 36 µm thickness for the alloy of the present invention treated with the aging heat treatment, even when assuming a safety factor of 1.5. Furthermore, in consideration of the fact that the positive electrode of the battery is actually corroded only during the charging time of the battery and during an unoperated time at a high temperature, the necessary thickness can be less than the above value. On the contrary, the alloy treated only with the solution heat treatment requires about 60 µm. In comparison with the above alloys, the conventional Al substrate, whereon stelite powder was plasma sprayed, reduced its weight by 0.7 mg/cm² even at a temperature as low as 350° C. for 1000 hours. The thickness reduction of the Al substrate due to corrosion at a constant rate continuously during one year was 0.8 µm. The reduced amount due to corrosion at a temperature as high as 400° C. for 1000 hours of the Al substrate was 4 mg/cm², and the thickness reduction of the Al substrate due to corrosion during one year was 40 µm. By multiplying these values by the expected life of the battery, the reduced thickness of the test piece becomes about 8 µm at 350° C., and about 400 µm at 400° C. Therefore, it is revealed that the conventional Al substrate, whereon stelite powder is plasma sprayed, is readily corroded, especially at a temperature as high as 400° C.

In accordance with the present invention, the amount of corroded material for the cell container for the positive electrode of the battery is small, and any problem in lowering the efficiency of the battery can be eliminated.

(Embodiment 4)

An alloy consisting of 0.1 wt. % C, 20 wt. % Cr, and the balance of Co was melted in an inert gas atmosphere. The alloy was heated at 1180° C. for one hour as a solution heat treatment, and cold rolled to form a plate 1.5 mm thick, 210 mm wide, and 400 mm long. Subsequently, the alloy was heated at 850° C. for 500 hours to perform an aging heat treatment. Structural observation with a scanning electron microscope and a corrosion test were performed on the alloy obtained by the aging heat treatment. The corrosion test was performed by immersing the sample into molten $Na_2S_4$ at 400° C. for 1000 hours as in the above embodiment 3.

As a result of the structure observation and the corrosion test, the formation of fine $M_6C$, $M_{23}C_6$ group carbides, smaller than 2 µm in diameter, in the alloy was confirmed, the amount of corrosion was 0.3 mg/cm², and the alloy was confirmed to have a desirable corrosion resistance even at a temperature as high as 400° C.

Because of the stable characteristics and the high reliability of the sodium-sulfur battery of the present invention, a battery system composed of a plurality of sodium-sulfur batteries of the present invention has also a high reliability, and so highly reliable power storage equipment, electric vehicles, emergency power supplies, uninterruptible power supplies, peak shift apparatus for electric power systems, frequency-voltage stabilizers, and other equipment and systems can be realized by using the above battery system.

In accordance with the present invention, deterioration of the characteristics of the battery hardly occurs, the reliability of the battery is significantly increased, and the duration time of the battery can be extended. Further, the material for the cell container for the positive electrode has a preferable plastic workability, and the manufacturing process for producing the vessel can be simplified.

What is claimed is:

1. A sodium-sulfur battery comprising:

a cell container for a negative electrode containing sodium;

a cell container for a positive electrode containing a positive mold composed of sulfur or sodium polysulfide;

a sodium ion conductive solid electrolyte separating said negative electrode and said positive electrode;

an insulator fixed to said cell container for the negative electrode and said cell container for the positive electrode, the insulator being connected to said solid electrolyte, wherein said cell container for the positive electrode is an integrated assembly consisting of a plurality of members, composed of high corrosion resistant materials of Co base or Ni base alloys containing Cr, and joined by welding; and means to reduce a stress added to a welded portion of said integrated assembly by said positive mold, wherein said material for composing said cell container for the positive electrode is one of:

(i) a Co base alloy consisting of at least 30 wt. % Co, 18~32 wt. % Cr, and at the utmost 0.2 wt. % C, and (ii) a Ni base alloy consisting of at least 40 wt. % Ni, 18~32 wt. % Cr and at the utmost 0.2 wt. % C.

2. A sodium-sulfur battery comprising:

a cell container for a negative electrode containing sodium;

a cell container for a positive electrode containing a positive mold composed of sulfur or sodium polysulfide;

a sodium ion conductive solid electrolyte separating said negative electrode and said positive electrode;

an insulator fixed to said cell container for the negative electrode and said cell container for the positive electrode, the insulator being connected to said solid electrolyte, wherein said cell container for the positive electrode is an integrated assembly consisting of a plurality of members, composed of high corrosion resistant materials of Co base or Ni base alloys containing Cr, and joined by welding; and a readily deformable portion is provided for said cell container for the positive electrode, wherein said material for composing said cell container for the positive electrode is one of:

(i) a Co base alloy consisting of at least 30 wt. % Co, 18~32 wt. % Cr, and at the utmost 0.2 wt. % C, and (ii) a Ni base alloy consisting of at least 40 wt. % Ni, 18~32 wt. % Cr and at the utmost 0.2 wt. % C.

3. A sodium-sulfur battery as claimed in claim 1, wherein said Co base alloy and said Ni base alloy contains any one of 3~15 wt. % W, 1~10 wt. % Mo, or 0.2~4 wt. % Al.

4. A sodium-sulfur battery comprising:

a cell container for a negative electrode containing sodium;

a cell container for a positive electrode containing a positive mold composed of sulfur or sodium polysulfide;

a sodium ion conductive solid electrolyte separating said negative electrode and said positive electrode;

an insulator fixed to said cell container for the negative electrode and said cell container for the positive electrode, the insulator being connected to said solid electrolyte, wherein said cell container for the positive electrode is an integrated assembly consisting of a plurality of members, composed of an alloy material containing Fe as a main component, 22~32 wt. % Cr, 14~24 wt. % Ni, utmost 0.2 wt. % C, and joined by welding; and means to reduce a stress added to a welded portion of said integrated assembly by said positive mold.

5. A sodium-sulfur battery comprising:

a cell container for a negative electrode containing sodium;

a cell container for a positive electrode containing a positive mold composed of sulfur or sodium polysulfide;

a sodium ion conductive solid electrolyte separating said negative electrode and said positive electrode;

an insulator fixed to said cell container for the negative electrode and said cell container for the positive electrode, the insulator being connected to said solid electrolyte, wherein said cell container for the positive electrode is an integrated assembly consisting of a plurality of members, composed of an alloy material containing Fe as a main component, 22~32 wt. % Cr, 14~24 wt. % Ni, utmost 0.2 wt. % C, and joined by welding; and a readily deformable portion is provided for said cell container for the positive electrode.

6. A battery system including one of a highly reliable power storage device, a power supply for an electric vehicle, an emergency power supply, an uninterruptible power supply, a peak shift apparatus for an electric power system, and a frequency-voltage stabilizer, wherein said sodium-sulfur battery as claimed in any one of claims 1, 2, 4, and 5 is used.

7. A sodium-sulfur battery as claimed in claim 4 or 5, wherein said alloy material contains 1~10 wt. % Mo.

8. A battery system including one of a highly reliable power storage device, a power supply for an electric vehicle, an emergency power supply, an uninterruptible power supply, a peak shift apparatus for an electric power system, and a frequency-voltage stabilizer, wherein said sodium-sulfur battery as claimed in claim 1 or 5 is used.

9. A battery system including one of a highly reliable power storage device, a power supply for an electric vehicle, an emergency power supply, an uninterruptible power supply, a peak shift apparatus for an electric power system, and a frequency-voltage stabilizer, wherein said sodium-sulfur battery as claimed in claim 2 is used.

10. A battery system including one of a highly reliable power storage device, a power supply for an electric vehicle, an emergency power supply, an uninterruptible power supply, a peak shift apparatus for an electric power system, and a frequency-voltage stabilizer, wherein said sodium-sulfur battery as claimed in claim 6 or 9 is used.

11. A sodium-sulfur battery as claimed in claim 10, wherein said cell container for the positive electrode includes an outer wall for the positive electrode containing the positive mold, and wherein said member extending away from a wall of the cell container for the positive electrode extends inward from said outer wall, said insulator being affixed to said member.

12. A sodium-sulfur battery as claimed in claim 10, wherein said member is L-shaped and has a weld of said integrated assembly interposed between the L-shaped member and said wall of the cell container for the positive electrode.

13. A sodium-sulfur battery as claimed in claim 10, wherein the means to reduce a stress further includes bellows provided integrally with the cell container for the positive electrode.

14. A sodium-sulfur battery as claimed in claim 13, wherein said bellows is provided integrally as part of said wall of the cell container for the positive electrode.

15. A sodium-sulfur batter as claimed in claim 13, wherein the bellows and the member extending away from a wall of the cell container do not contact the positive mold.

16. A sodium-sulfur battery as claimed in claim 10, wherein said member extending away from a wall of the cell container does not contact the positive mold.

17. A sodium-sulfur battery as claimed in claim 16, wherein the bellows does not contact the positive mold.

18. A sodium-sulfur battery as claimed in claim 17, wherein said member is L-shaped and has a weld of said integrated assembly interposed between the L-shaped member and said wall of the cell container for the positive electrode.

19. A sodium-sulfur battery as claimed in claim 17, wherein the means to reduce a stress further includes bellows provided integrally with the cell container for the positive electrode.

20. A sodium-sulfur batter as claimed in claim 19, wherein the bellows and the member extending away from a wall of the cell container do not contact the positive mold.

21. A sodium-sulfur battery as claimed in claim 20, wherein said member extending away from a wall of the cell container does not contact the positive mold.

22. A sodium-sulfur battery as claimed in claim 21, wherein the bellows does not contact the positive mold.

23. A sodium-sulfur battery as claimed in claim 20, wherein said bellows is provided integrally as part of said wall of the cell container for the positive electrode.

24. A sodium-sulfur battery comprising:
a cell container for a negative electrode containing sodium;
a cell container for a positive electrode containing a positive mold composed of sulfur or sodium polysulfide;
a sodium ion conductive solid electrolyte separating said negative electrode and said positive electrode;
an insulator fixed to said cell container for the negative electrode and said cell container for the positive electrode, the insulator being connected to said solid electrolyte, wherein said cell container for the positive electrode is an integrated assembly consisting of a plurality of members, composed of high corrosion resistant materials of Co base or Ni base alloys containing Cr, and joined by welding; and
means to reduce a stress added to a welded portion of said integrated assembly by said positive mold, wherein said means to reduce a stress includes a member extending away from a wall of the cell container for the positive electrode and interposed between a weld of said integrated assembly and the insulator.

25. A sodium-sulfur battery comprising:
a cell container for a negative electrode containing sodium;
a cell container for a positive electrode containing a positive mold composed of sulfur or sodium polysulfide;
a sodium ion conductive solid electrolyte separating said negative electrode and said positive electrode;
an insulator fixed to said cell container for the negative electrode and said cell container for the positive electrode, the insulator being connected to said solid electrolyte, wherein said cell container for the positive electrode is an integrated assembly consisting of a plurality of members, composed of high corrosion resistant materials of Co base or Ni base alloys containing Cr, and joined by welding; and
a readily deformable portion is provided for said cell container for the positive electrode, wherein said readily deformable portion is a bellows, provided for the cell container for the positive electrode.

26. A sodium-sulfur battery comprising:
a cell container for a negative electrode containing sodium;
a cell container for a positive electrode containing a positive mold composed of sulfur or sodium polysulfide;
a sodium ion conductive solid electrolyte separating said negative electrode and said positive electrode;
an insulator fixed to said cell container for the negative electrode and said cell container for the positive electrode, the insulator being connected to said solid electrolyte, wherein said cell container for the positive electrode is an integrated assembly consisting of a plurality of members, composed of an alloy material containing Fe as a main component, 22~32 wt. % Cr, utmost 0.2 wt. % C, and joined by welding; and
means to reduce a stress added to a welded portion of said integrated assembly by said positive mold, wherein said means to reduce a stress includes a member extending away from a wall of the cell container for the positive electrode and interposed between a weld of said integrated assembly and the insulator.

27. A sodium-sulfur battery as claimed in claim 20, wherein said cell container for the positive electrode includes an outer wall for the positive electrode containing the positive mold, and wherein said member extending away from a wall of the cell container for the positive electrode extends inward from said outer wall, said insulator being affixed to said member.

28. A sodium-sulfur battery comprising:
a cell container for a negative electrode containing sodium;
a cell container for a positive electrode containing a positive mold composed of sulfur or sodium polysulfide;
a sodium ion conductive solid electrolyte separating said negative electrode and said positive electrode;
an insulator fixed to said cell container for the negative electrode and said cell container for the positive electrode, the insulator being connected to said solid electrolyte, wherein said cell container for the positive electrode is an integrated assembly consisting of a plurality of members, composed of an alloy material containing Fe as a main component, 22~32 wt. % Cr, utmost 0.2 wt. % C, and joined by welding; and
a readily deformable portion is provided for said cell container for the positive electrode, wherein said readily deformable portion is a bellows, provided for the cell container for the positive electrode.

* * * * *